US011952472B2

(12) United States Patent
Zhou et al.

(10) Patent No.: US 11,952,472 B2
(45) Date of Patent: Apr. 9, 2024

(54) PREPARATION METHOD AND PRODUCT OF CARBON FIBER REINFORCED POLYMER COMPOSITE WITH DESIGNABLE CHARACTERISTIC STRUCTURE

(71) Applicant: HUAZHONG UNIVERSITY OF SCIENCE AND TECHNOLOGY, Hubei (CN)

(72) Inventors: Huamin Zhou, Hubei (CN); Helezi Zhou, Hubei (CN); Zhigao Huang, Hubei (CN); Fengjia Zhang, Hubei (CN); Yun Zhang, Hubei (CN); Yunming Wang, Hubei (CN); Dequn Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 442 days.

(21) Appl. No.: 17/237,064

(22) Filed: Apr. 22, 2021

(65) Prior Publication Data
US 2021/0332203 A1 Oct. 28, 2021

(30) Foreign Application Priority Data
Apr. 22, 2020 (CN) .......................... 202010324292.X (51) Int. Cl.
*C08J 5/24* (2006.01)
*B29C 70/36* (2006.01)
(Continued)

(52) U.S. Cl.
CPC .............. *C08J 5/243* (2021.05); *B29C 70/36* (2013.01); *B33Y 10/00* (2014.12); *B33Y 70/10* (2020.01);
(Continued)

(58) Field of Classification Search
CPC ...... C08J 5/243; C08J 7/0427; C08J 2363/06; C08J 2377/06; B33Y 10/00; B33Y 80/00;
(Continued)

(56) References Cited

FOREIGN PATENT DOCUMENTS

KR 101436500 * 10/2014

OTHER PUBLICATIONS

Bearat et al., Environmentally responsive injectables materials, European Journal of Medicinal Chemistry, 2020.*

* cited by examiner

Primary Examiner — Camie S Thompson
(74) Attorney, Agent, or Firm — JCIP GLOBAL INC.

(57) ABSTRACT

The disclosure discloses a preparation method and product of carbon fiber reinforced polymer composites with a designable characteristic structure. The method includes: (a) choosing carbon fabrics as raw material, where a predetermined number of the fabrics are selected to deposit the reinforcement phase; (b) coating all carbon fabrics with resin matrix, placing the fabrics layer by layer, where the carbon fabrics with the reinforcement phases are placed in a predetermined layer, meanwhile a micro power supply is placed in a setting layer during the stacking process, then a prefabricated product is obtained; (c) placing the prefabricated product in a vacuum bag then evacuating and sealing, hot pressing the sealed prefabricated product, finally the carbon fiber reinforced polymer composite product in the vacuum bag after hot pressing is successfully manufactured.

8 Claims, 4 Drawing Sheets (51) Int. Cl.
*B29K 63/00* (2006.01)
*B29K 77/00* (2006.01)
*B29K 307/04* (2006.01)
*B33Y 10/00* (2015.01)
*B33Y 70/10* (2020.01)
*B33Y 80/00* (2015.01)
*C08J 7/04* (2020.01)

(52) U.S. Cl.
CPC ............ *B33Y 80/00* (2014.12); *C08J 7/0427* (2020.01); *B29K 2063/00* (2013.01); *B29K 2077/00* (2013.01); *B29K 2307/04* (2013.01); *C08J 2363/00* (2013.01); *C08J 2377/06* (2013.01)

(58) Field of Classification Search
CPC ..... B33Y 70/10; B29C 70/36; B29K 2063/00; B29K 2077/00; B29K 2307/04; B82Y 40/00; D06M 11/74; D06M 2101/40; D06N 2209/048; D10B 2101/122; D10B 2401/16
USPC ...................................... 428/297.4
See application file for complete search history.

Crack propagation area S

PREPARATION METHOD AND PRODUCT OF CARBON FIBER REINFORCED POLYMER COMPOSITE WITH DESIGNABLE CHARACTERISTIC STRUCTURE

CROSS-REFERENCE TO RELATED APPLICATION

This application claims the priority benefit of China application serial no.202010324292.X, filed on Apr. 22, 2020. The entirety of the above-mentioned patent application is hereby incorporated by reference herein and made a part of this specification.

BACKGROUND

Technical Field

The disclosure belongs to a technical field related to carbon fiber reinforced polymer composites (CFRP), and in particular, relates to a preparation method and product of carbon fiber reinforced polymer composites with a designable characteristic structure.

Description of Related Art

The CFRP is widely used as various important components, such as aircraft fuselages, submarine propellers and repairs of the bridge piers as a result of the material's high specific strength and high specific modulus. During the service process of a structural part, one of the key issues is monitoring of the health/damage status of the structural part. At present, a variety of non-destructive detection methods are available to detect the CFRP damage, which include ultrasonic C-scan, X-ray, thermal imaging, and eddy current techniques and so on. However, in some fields such as aerospace, rail transit, etc, the target components are required to be deactivated while the damage inspection and evaluation are performed, thus online monitoring may not be achieved. Nevertheless, some other online detection techniques, including the optical fiber sensing technique, have been developed. However, an external sensor (e.g., optical fiber) is required to be attached in the CFRP structure for those methods. The installation of the sensing system is time-consuming and labor-intensive. Moreover, problems such as the fragility of the sensing system, the adaptability to the service conditions, and the combination with the structural part under detection are also needed to be addressed. Further, due to large size of the optical fiber sensor and weak bonding interfacial strength of the sensors and the resin, the interface may trigger a potential defect. These problems may affect the scope of applications of its detection technique and may even degenerate the mechanical performances of the structural parts under detection.

Further, it is difficult to repair the damage of CFRP with the matrix of thermosetting or high temperature thermoplastic resin by reheating. To overcome this issue, part or all of the thermosetting matrix is replaced by a kind of special thermoplastic matrix with characteristic structural design on the cracks easily growing regions. After damage is detected, a specific repair technique (e.g., laser beam irradiation, heating, etc.) could be adopted to recover the mechanical bearing capacity of the parts for continued service, thus the repairability is provided to the CFRP. All in all, urgent need exists for quickly online (in situ) detecting a damaged region in the composites and performing modification simultaneously.

SUMMARY

According to the above-mentioned technical defects or requirements for improvements of the related art, the disclosure provides a CFRP preparation method and product with a designable characteristic structure. Through the use of multiple layers of carbon fabric, a micro power supply is disposed in a multi-layer structure. Combination of the micro power supply and a conductive property of the carbon fabric may be applied to easily and quickly detect locations of various defects such as cracks and damage in the product. In this way, data collected by a non-destructive online monitoring technique is more precise and accurate, and data analysis is humanized and intelligent. Real-time feedback of a damage signal is thereby achieved, and a solution corresponding to the damage may be accordingly formulated.

To realize the above purpose, according to one aspect of the disclosure, a CFRP preparation method with a designable characteristic structure is provided, and the preparation method includes the following steps.

(a) A plurality of carbon fabrics are selected to act as a raw material, and a predetermined number of carbon fabrics are selected to form the designed reinforcement phase on each of the carbon fabrics.

(b) Surfaces of all of the above mentioned carbon fabrics are coated with a resin matrix solution, and the carbon fabrics are placed layer by layer. The carbon fabrics with the reinforcement phases on the surfaces are placed in a predetermined layer. At the same time, a micro power supply is placed in a setting layer during a stacking process, then a prefabricated product is obtained.

(c) The prefabricated product is placed in a vacuum bag for evacuating and sealing, the sealed prefabricated product is hotpressed, and a product in the vacuum bag after hotpressing is the required carbon fiber reinforced polymer composite product.

Preferably, in step (a), a material of the reinforcement phase is a CNT-added polymer material.

Preferably, in step (a), a forming method of the reinforcement phase is a 3D printing method, an electrospinning method, or an automatic fiber placement method.

Preferably, in step (b), the micro power supply is a micro power supply device for wireless charging or a sensor device featuring piezoelectric effect.

Preferably, in step (b), a position where the micro power supply is placed in certain position where stress is concentrated or detection is required to be strengthened.

Preferably, in step (b), a curing agent is added to the resin matrix solution to accelerate thecuring of the resin.

Preferably, in step (b), the resin matrix solution is thermoplastic or thermosetting resin.

Preferably, in step (c), when the prefabricated product is placed in the vacuum bag, an isolation film is preferably laid in the vacuum bag to facilitate the removal of the carbon fiber reinforced polymer composite product from the vacuum bag after hotpressing.

According to another aspect of the disclosure, a product obtained through the foregoing preparation method is provided.

In general, the above-mentioned technical solutions provided by the disclosure have the following beneficial effects compared with the related art.

1. In the disclosure, carbon fiber reinforcement is used as a raw material. Since carbon fibers are conductive, through the characteristics of coupling of damage and resistance of the carbon fibers, the damage status may be in situ monitored in accordance with resistance changes. The micro power supply is placed in the carbon fiber layer in the disclosure. Nevertheless, in the related art, an external power source is used to measure the electrical resistance of the composite. Regarding a composite under test with a large area, a large amount of external power supplies is needed in the related art. Moreover, it cannot reach the required detection position, and low measurement accuracy is thereby provided. In the disclosure, the material has its own micro power supply, and no external power supply is needed. The micro power supply may be placed in the position where the stress is concentrated. The measurement accuracy is increased in this way, and the measurement circuit is greatly simplified. Further, the detection accuracy and reliability of the CFRP part are improved, and the crack propagation region is analyzed for mechanical enhancement and repairability, and the application of the multi-functional CFRP is expanded.

2. In the disclosure, through the designability of the designable characteristic structure technique, the interlayer phase of the carbon fiber reinforced polymer composite is designed. According to the differences in the shapes and service conditions of the carbon fiber reinforced polymer composites, the stress field is analyzed. The interlayer phase is specifically designed, and the mechanical performance of the structural part thereby may better adapt to the service conditions. Possible cracks may also be predicted and controlled. The path of crack development is controlled through the shape and pattern of the interlayer phase, such that the influence brought by the cracks on the performance of the structural part is reduced. The application scope and service life of the structural part of the carbon fiber reinforced polymer composite are therefore increased.

3. In the disclosure, the specific design of the pattern and the shape of the interlayer phase through the technique of the designable characteristic structure may be combined with the circuit design. According to the service conditions and the shape of the structural part, a conductive material may be designed with the interlayer phase. Through the conductive property of the carbon fibers, the monitoring circuit may cover all key monitoring regions and even all regions of the structural part.

4. In the disclosure, under the different service conditions of the structural part of the carbon fiber reinforced polymer composite, local strengthening and toughening are specifically performed. The mechanical property of the structural part is improved, and the generation and propagation of cracks are specifically monitored under different loading conditions of the structural part. Further, in order to make the data collected by the non-destructive online monitoring technique precise and accurate, data analysis to be humanized and intelligent, a damage signal to be fed back quickly, and a solution to be accordingly formulated to deal with the damage, in the disclosure, the designable microstructure technique is combined with the production of the carbon fiber reinforced polymer composite to achieve the combination of the non-destructive online monitoring system with supporting software and terminal system in the resistance method.

To make the aforementioned techniques more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

Figure 1:
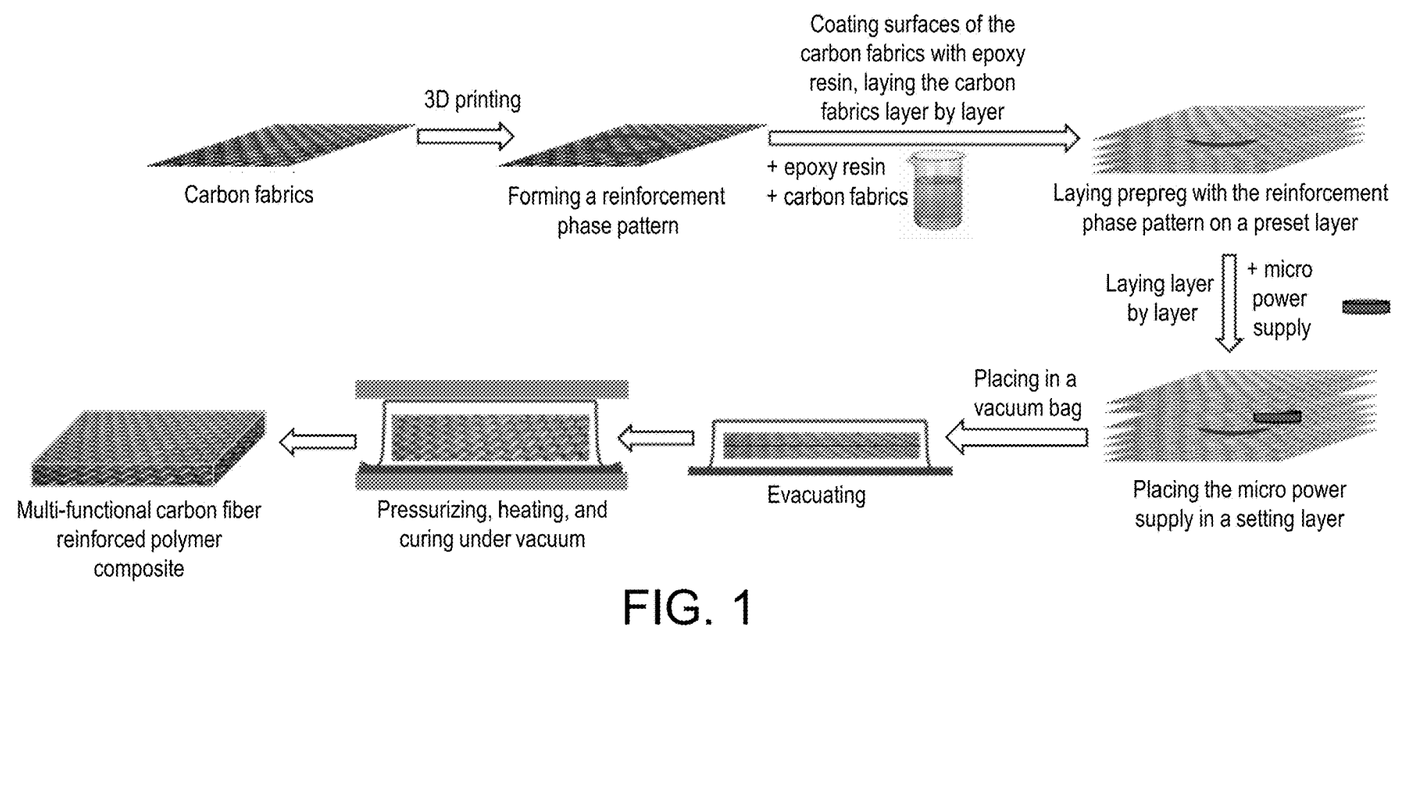
FIG. 1 is a flow chart of preparing a carbon fiber reinforced polymer composite product according to a preferred embodiment of the disclosure.

As shown in FIG. 1, a method for preparing a carbon fiber reinforced polymer composite with a designable characteristic structure, and the method includes the following steps.

1) An interlayer reinforcement phase pattern is designed in advance, and a forming method is selected to form reinforcement phases on surfaces of carbon fabric to realize the laying of an interlayer reinforcement material on the carbon fabric.

A CNT-added polymer material is selected as the material of the reinforcement phase, for example, CNT-added nylon (PA), capable of improving conductivity while increasing strength and toughness. The forming method may selectively be, but not limited to, a 3D printing technique, an electrospinning technique, or an automatic fiber placement technique and the like.

2) A vacuum bag film is laid on a workbench and is fixed and sealed with sealant. In order to have the resin completely infiltrate the carbon fabric, after an isolation film layer is spread on the vacuum bag film, the laying and resin infiltration of the reinforced carbon fabric in step 1) are performed. The resin and a curing agent are fully mixed according to a specific ratio to obtain a mixed solution. After the mixed solution is evenly coated on the isolation film, a layer of reinforced carbon fabric is spread, and the resin mixed solution is evenly coated on the reinforced carbon fabric. Another layer of carbon fabric is laid, and such step is repeatedly performed until all carbon fabric are stacked.

According to needs of a target product, carbon fabric with reinforcement materials on surfaces is laid on a specific layer.

3) According to needs of the target product, a micro power supply (which may be wirelessly charged) is pre-embedded in the specific layer and in a specific location before manual placing is continuously performed.

The micro power supply is a micro power supply device for wireless charging or a sensor device featuring piezoelectric effect, and an electromagnetic induction technique may be adopted to be applied to the micro power supply for wireless charging. After charging is completed, a voltage is provided for a monitoring circuit in the target product.

4) After completion, the vacuum bag film is laid on a top for sealing and evacuating.

5) A hotpressing process is completed by a hot-press, and a product is removed from a vacuum bag to obtain the target product.

After step 4) is completed, the obtained semi-finished product is transferred to a hot-press. The hot pressing temperature, time, and pressure are set according to resin performance, and hot pressing is set according to the resin performance to cure the resin. After the hot pressing is completed, the target product is obtained.

Regarding the above process, thermoplastic resin or thermosetting resin may be selectively used for infiltration according to needs of the target product.

The carbon fiber reinforced polymer composite provided by the disclosure has the following characteristics.

1) According to a health status of a part fed back by an electrical signal, external field loading conditions (force, time, temperature, etc.) of the part are adjusted simultaneously to minimize a damage expansion speed while meeting service requirements.

2) A piezoelectric material, the micro power supply, etc. are embedded in a part monitoring region in advance, and in this way, the generation of a signal flow in a monitoring system without external electric field is realized.

3) An electromagnetic induction acquisition system is established between a terminal acquisition system and a part under detection. An electrical signal generated by the structural part under detection is received for analysis, and in this way, signal flow reception in a passive detection system is realized.

4) Through utilizing the advantages of a thermoplastic material that can be melted and reshaped, especially when being applied to a carbon fiber reinforced thermosetting resin composite, therepairability of a damaged partmay be realized.

The disclosure is further described in detail in combination with specific embodiments as follows.

Figure 2:
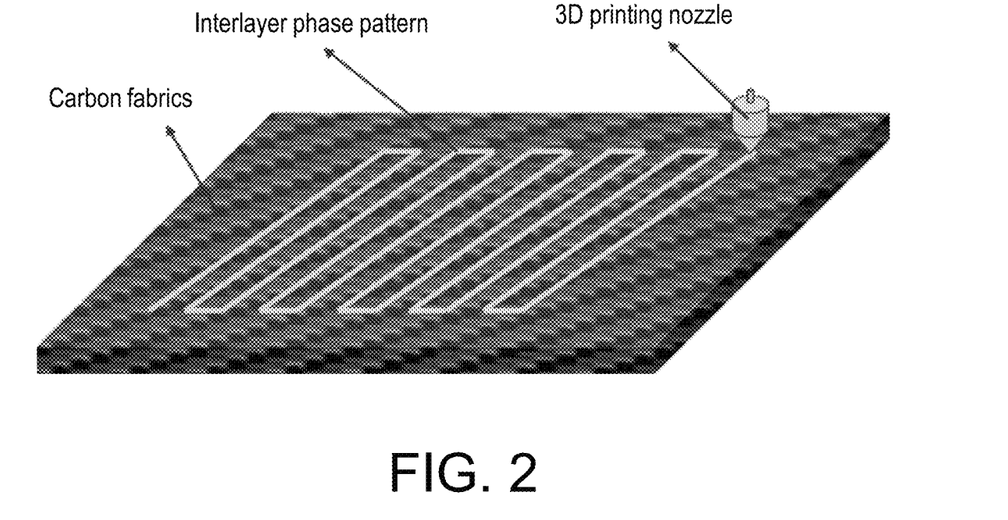
FIG. 2 is a schematic diagram of forming a reinforcement phase according to a preferred embodiment of the disclosure.
Figure 3:
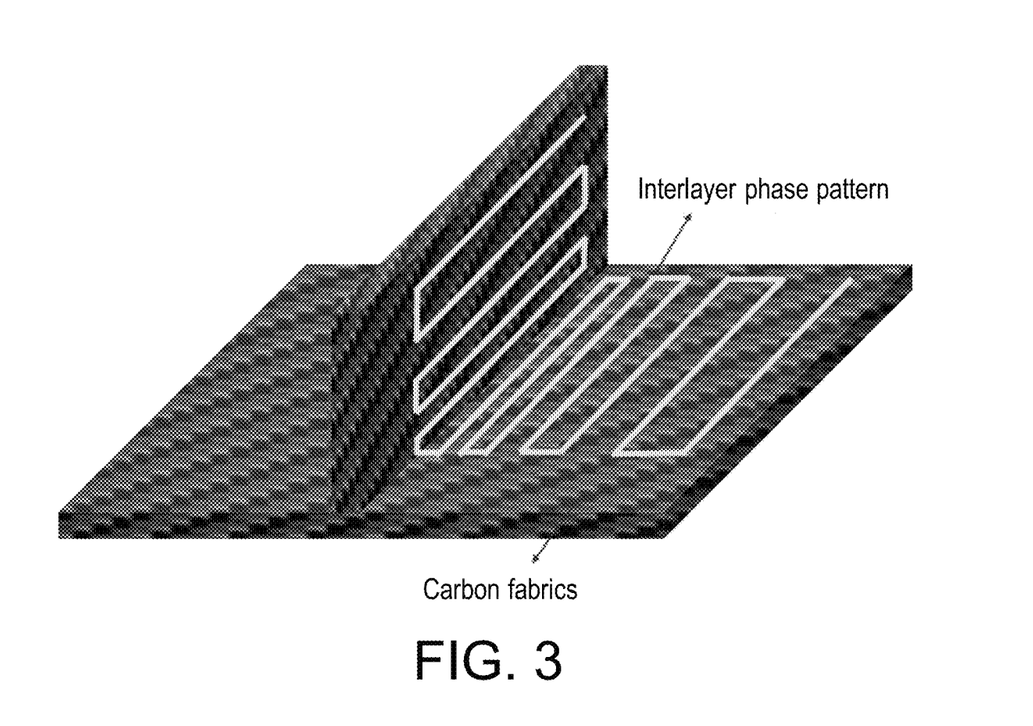
FIG. 3 is a schematic diagram of a structure between layers of carbon fabric according to a preferred embodiment of the disclosure.

As shown in FIGS. 1 to 3, specific steps for preparing a carbon fiber reinforced polymer composite product are provided as follows.

1) 16 pieces of cutted T300 woven carbon fabric (33 cm*25 cm) are prepared. 200 g of Araldite® LY 1564 epoxy resin and Aradur® 22962 curing agent are prepared and evenly mixed according to a ratio of 4:1, and heated at 40° C.

2) A prepared carbon fabric is selected and is placed on an FDM printer workbench. Nylon 6 added with CNT is selected as a printing raw material, and a ring-shaped rectangular interlayer phase with a length of 20 cm, a width of 3 cm, and a thickness of 0.2 mm (as shown in FIG. 2) is printed. The obtained carbon fabric with the reinforced interlayer phase is set aside.

3) A total of 9 g of DMF and acetone are used and are evenly mixed according to a mass ratio of 3:2, and a solvent is obtained. 1 g of PVDF powder is used and poured into the prepared solvent. At 40° C., magnetically stirring is performed for 30 minutes, and a PVDF solution for electrospinning is obtained. A prepared carbon fabric is selected and is rolled on a collection roller in an electrospinning apparatus. The voltage is set to 18 kV, the distance between the top of a solution injector and the collection roller is 15 cm, and the solution feeding speed in the injector is 1 mm/h. After spinning is performed for half an hour, one piece of fabric covered with a PVDF film on the surface is obtained and set aside.

4) A 4 mm-thick aluminum plate is put on a heating plate, and the heating plate temperature is set to 40° C. After the surface of the aluminum plate is cleaned, a layer of 40 cm*30 cm vacuum bag film is laid and is fixed onto the aluminum plate by gluing four sides thereof with sealant. At this time, white paper on a surface of the sealant is not to be torn. A layer of 33 cm*25 cm isolation film is laid on the vacuum bag film. A brush is then dipped into mixed epoxy resin and the epoxy resin is evenly brushed on a surface of the isolation film, then one layer of carbon fabric is covered on the isolation film. A brush is used to evenly brush the epoxy resin on the surface of the carbon fabric, the carbon fabric is covered layer by layer until all the carbon fabric are placed. The carbon fabric with reinforced interlayer phase is laid on the $5^{th}$ layer, and the carbon fabric with PVDF film is laid on the 9' layer. After the carbon fabricis laid, a 40 cm*30 cm vacuum bag film is placed on the surface, and the white paper on the surface of the sealant is torn off. Two layers of the vacuum bag film pair form a sealed space. A vacuum pump is used to evacuate the sealed space.

5) The aluminum plate and the prepared semi-finished product are transferred to the hot-press, the set pressure is 2 MPa, the heating temperature is 180° C., and the heating time is 4 hours. After the hotpressing is completed, the finished product is removed, and the vacuum bag film and the isolation film on the surface are removed to obtain the finished product.

Regarding the product obtained in the above-mentioned embodiments, the following analysis is performed, and details are provided as follows.

Figure 4:
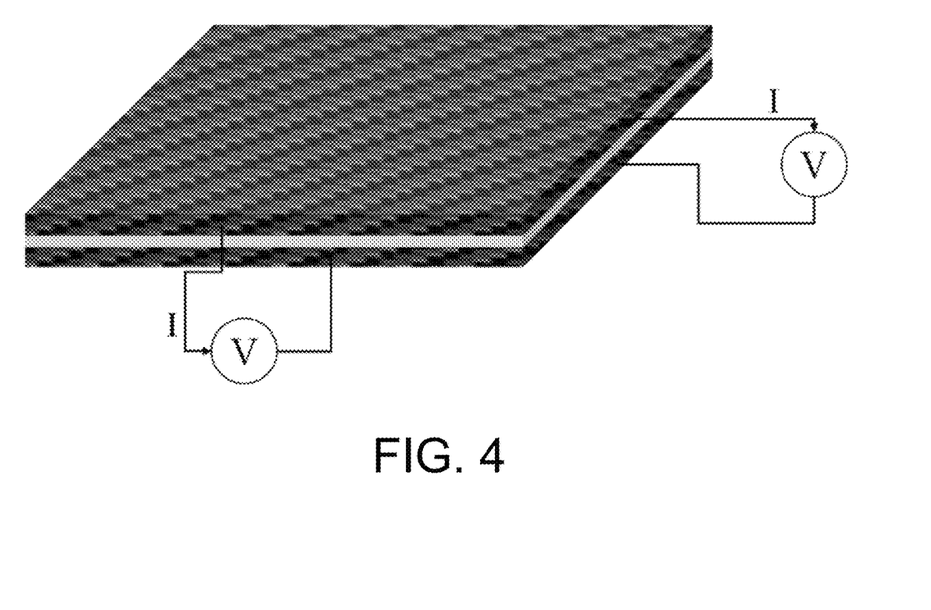
FIG. 4 is a schematic diagram of a multi-channel circuit for delamination damage monitoring of a conductive property of the carbon fiber reinforced polymer composite product according to a preferred embodiment of the disclosure.
Figure 5:
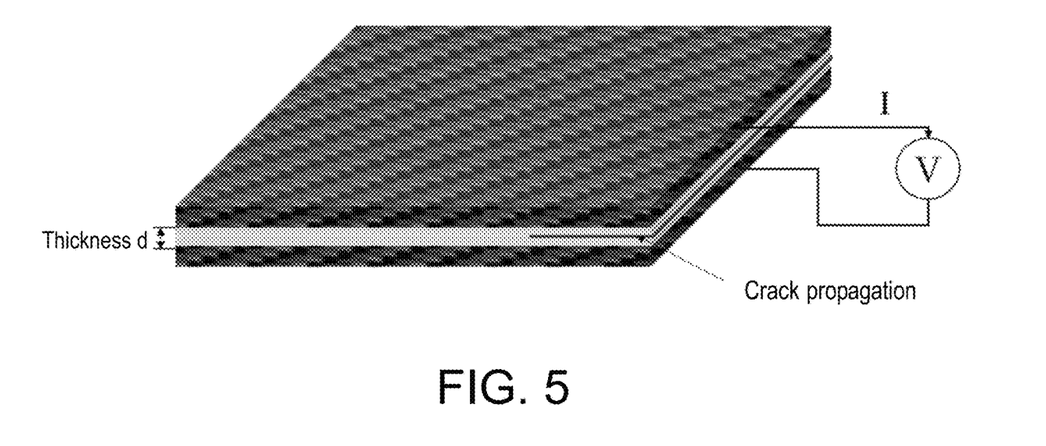
FIG. 5 is a schematic diagram of any channel circuit in the multi-channel circuit for delamination damage monitoring of the conductive property of the carbon fiber reinforced polymer composite product according to a preferred embodiment of the disclosure.
Figure 6:
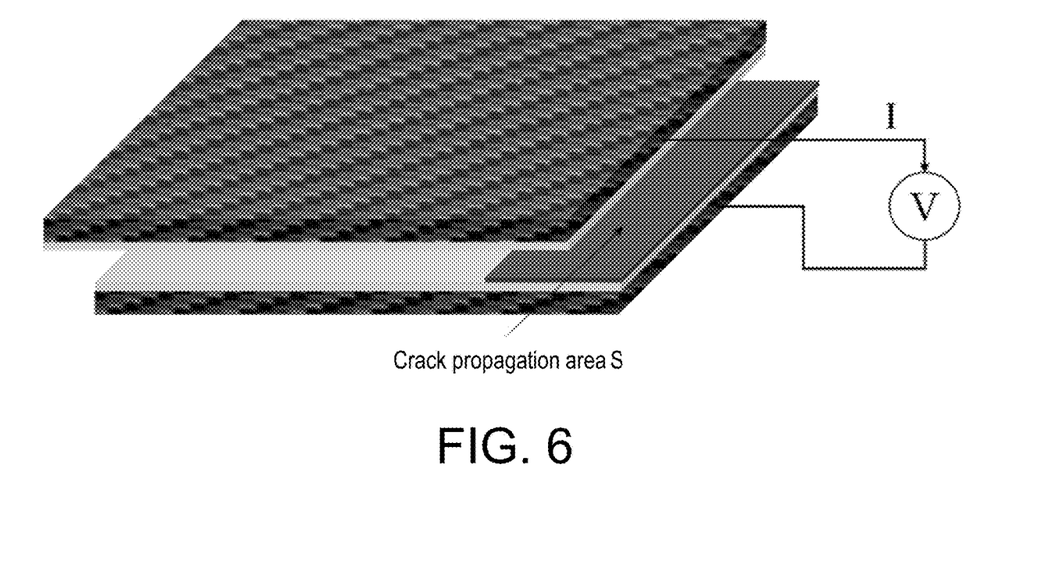
FIG. 6 is a schematic diagram of a crack propagation surface in the delamination damage monitoring of the conductive property of the carbon fiber reinforced polymer composite product according to a preferred embodiment of the disclosure.

Regarding delamination damage, a schematic diagram of a multi-directional monitoring circuit is shown in FIG. 4, and schematic diagrams of monitoring circuits in any direction are shown in FIGS. 5 and 6. A method of calculating a resistance of this product is provided as follows:

$$R = R_c + R_i + R_e + R_m = V/I \tag{1}$$

$$R_m = \rho d/(S_0 - S) \tag{2}$$

where $S_0$ is the total area of the carbon fiber reinforced polymercomposite laminates, R is the total resistance of the carbon fiber reinforced polymer composite laminates under detection, V is the applied voltage, I is the current, $R_m$ is the resistance in the thickness direction between the two layers of carbon fabric, $R_e$ is the resistance of other parts of the circuit (including an internal resistance of a monitoring circuit), $R_c$ is the resistance of the carbon fibers along a longitudinal direction, and $R_i$ is the interface resistance between a wire electrode and the carbon fibers.

From formulas (1) and (2), it can be seen that when the structural part under detection is constant, $R_c$, $R_i$, and $R_e$ are all fixed values. It thus can be seen that a total resistance of the carbon fiber reinforced polymer composite laminates under detection changes with the change of a crack propagation area S.

Figure 7:
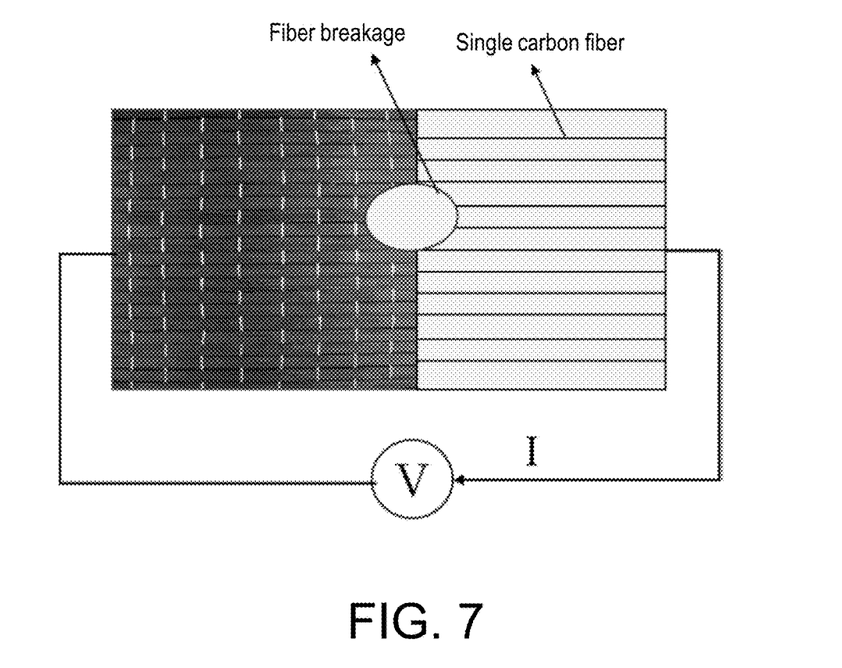
FIG. 7 is a schematic diagram of a fiber breakage monitoring circuit of the conductive property of the carbon fiber reinforced polymer composite product according to a preferred embodiment of the disclosure.

Regarding fiber breakage and damage, a schematic diagram of the monitoring circuit is shown in FIG. 7, and a method of calculating the resistance is provided as follows:

$$R = R_c + R_e + R_i + R_m = V/I \qquad (3)$$

$$R_C = \frac{R_0}{n} \qquad (4)$$

where R is the detected total resistance of the carbon fiber reinforced polymer composite laminates, V is the applied voltage, I is the current, $R_c$ is the total resistance of the carbon fibers along the longitudinal direction, $R_e$ is the resistance of other parts of the circuit (including the internal resistance of a monitoring circuit), $R_i$ is the interface resistance between the wire electrode and the carbon fibers, $R_m$ is the total longitudinal resistance of the middle layer of the carbon fabric, $R_0$ is the longitudinal resistance of a single carbon fiber, and n is the layer of the carbon fabric.

From formulas (3), (4), and (5), it can be seen that when fiber breakage occurs in the composite laminates under detection, a broken fiber becomes an open circuit, and the effective conductive carbon fiber number n and the total resistance $R_m$ of the intermediate layer change, so that the total resistance of the carbon fiber reinforced polymer composite laminates under detection changes.

The monitoring area of the structural part under detection is designed with a piezoelectric material to realize the generation of the signal flow without external voltage input. An electromagnetic induction system is established between the structural part under detection and a terminal analysis system to realize wireless reception of the signal flow. When damage occurs, electrical signals generated by the structural part under detection change. This change is transmitted to the terminal analysis system through the internal monitoring circuit and the electromagnetic induction system of the structural part under detection. The terminal system then intelligently analyzes the collected electrical signals and automatically recognizes damaged electrical signals and other electrical signals. Regarding the damaged electrical signals, the terminal system transmits key monitoring information such as damage types, damage degrees, and damage locations to the user software. As such, a user can precisely, accurately, and intelligently monitor the health status of the structural part under in situ detection and make timely adjustments to the use of the structural part under detection to minimize economic losses and casualties.

Through the use of carbon fiber's own conductivity for monitoring circuit design, mechanical performance of the structural part under detection is prevented from being negatively affected by a conventional added sensing system (e.g., fiber optic sensing technology). Moreover, the significant difficulty to install the sensing system and the vulnerability of the added sensing system are accordingly solved. Service life of the non-destructive online monitoring system is increased, and the speed, precision, and accuracy of the non-destructive online monitoring technology for detecting the structural part of the carbon fiber reinforced polymer composite are improved. Through the establishment of the electromagnetic induction system between the structural part under detection and the terminal system, passive and wireless detection is realized. In this way, inconvenience brought by the conventional wired connection to the use of the structural part is prevented, and the application scope of the online monitoring technology is expanded.

In addition, the thermoplastic material exhibits the advantage of being meltable and reprocessable. Based on the above technical solutions, a conventional thermosetting material may be partially or completely replaced by the thermoplastic material. That is, the thermoplastic material is used for the design of a multi-functional carbon fiber reinforced polymer composite. When the structural part of the multi-functional carbon fiber reinforced polymer composite is damaged, a specific repair technique, such as laser beam irradiation, heating, etc., may be adopted to directly repair the damaged part without disassembly. The repairability of the structural part of the carbon fiber reinforced polymer composite is thereby improved, and as such, the scope of use of the carbon fiber reinforced polymer composite is expanded, the service life is increased, and the costs of use are reduced.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A preparation method of a carbon fiber reinforced polymer composite with a designable characteristic structure, comprising:
    step (a) selecting a plurality of carbon fabric as a raw material, wherein a predetermined number of carbon fabrics are selected, and a reinforcement phase is formed on each of the carbon fabric;
    step (b) coating surfaces of all the carbon fabric in the raw material with a resin matrix solution, placing the carbon fabric layer by layer, wherein the carbon fabric with the reinforcement phases on the surfaces are placed in a predetermined layer, and at a same time, a micro power supply is placed in a setting layer during a stacking process to accordingly obtain a prefabricated product; and
    step (c) placing the prefabricated product in a vacuum bag for evacuating and sealing, hotpressing the sealed prefabricated product, wherein a product in the vacuum bag after hotpressing is a required carbon fiber reinforced polymer composite product.

2. The preparation method according to claim 1, wherein a material of the reinforcement phase in step (a) is a CNT-added polymer material.

3. The preparation method according to claim 1, wherein a forming method of the reinforcement phase in step (a) is a 3D printing method, an electrospinning method, or an automatic fiber placement method.

4. The preparation method according to claim 1, wherein the micro power supply in step (b) is a micro power supply device for wireless charging or a sensor device having a piezoelectric effect.

5. The preparation method according to claim 1, wherein a position where the micro power supply is placed in step (b) is a position where stress is concentrated or detection is required to be strengthened.

6. The preparation method according to claim 1, wherein a curing agent is added to the resin matrix solution to accelerate curing of the resin in step (b).

7. The preparation method according to claim 1, wherein the resin matrix solution in step (b) is thermoplastic or thermosetting resin.

8. The preparation method according to claim 1, wherein when the prefabricated product is placed in the vacuum bag in step (c), an isolation film is laid in the vacuum bag to facilitate the removal of the carbon fiber reinforced polymer composite product from the vacuum bag after hotpressing.

* * * * *